US011681828B2

(12) United States Patent
Hu et al.

(10) Patent No.: US 11,681,828 B2
(45) Date of Patent: Jun. 20, 2023

(54) PASSTHROUGH MOBILE APPLICATION POLICY

(71) Applicant: FORD GLOBAL TECHNOLOGIES, LLC, Dearborn, MI (US)

(72) Inventors: Jeffrey Yizhou Hu, Sunnyvale, CA (US); Jonathan Moss, Tracy, CA (US); Ashish Nadkar, San Jose, CA (US); Tuan Nguyen, Milpitas, CA (US); Satbir Tanda, Redwood City, CA (US)

(73) Assignee: Ford Global Technologies, LLC, Dearborn, MI (US)

( * ) Notice: Subject to any disclaimer, the term of this patent is extended or adjusted under 35 U.S.C. 154(b) by 302 days.

(21) Appl. No.: 16/985,550

(22) Filed: Aug. 5, 2020

(65) Prior Publication Data

US 2022/0043924 A1 Feb. 10, 2022

(51) Int. Cl.
*G06F 21/62* (2013.01)
*G06F 9/54* (2006.01)
*B60R 25/01* (2013.01)
*G06F 21/60* (2013.01)
*H04L 9/40* (2022.01)

(52) U.S. Cl.
CPC ............ *G06F 21/629* (2013.01); *B60R 25/01* (2013.01); *G06F 9/547* (2013.01); *G06F 21/602* (2013.01); *H04L 63/102* (2013.01)

(58) Field of Classification Search
CPC ...... G06F 21/629; G06F 9/547; G06F 21/602; B60R 25/01; H04L 63/102
See application file for complete search history.

(56) References Cited

U.S. PATENT DOCUMENTS

| 9,554,241 | B2 | 1/2017 | Foster | |
|---|---|---|---|---|
| 9,876,594 | B1 | 1/2018 | Nadkar | |
| 10,464,529 | B1* | 11/2019 | Zhang | ................ G07C 9/00309 |
| 2018/0091608 | A1* | 3/2018 | Camacho | .............. H04L 63/102 |
| 2018/0336551 | A1* | 11/2018 | Mouftah | ............... H04L 9/3213 |
| 2019/0020985 | A1* | 1/2019 | Dai | ..................... H04L 61/2592 |
| 2019/0141047 | A1* | 5/2019 | Lee | ....................... H04L 63/102 |

* cited by examiner

*Primary Examiner* — Noura Zoubair
*Assistant Examiner* — Zoha Piyadehghibi Tafaghodi
(74) *Attorney, Agent, or Firm* — Joseph M. Zane; Brooks Kushman P.C.

(57) ABSTRACT

Permission to execute a remote procedure call as requested by a first vehicle-enabled application over a first connection is validated using permissions assigned to the first vehicle-enabled application according to a policy table of the vehicle. Permission to execute the remote procedure call as requested by the second vehicle-enabled application over the second connection as forwarded to vehicle over the first connection is validated using permissions assigned to the second vehicle-enabled application according to the policy table of the vehicle.

15 Claims, 8 Drawing Sheets

PASSTHROUGH MOBILE APPLICATION POLICY

TECHNICAL FIELD

Aspects of the disclosure generally relate to a passthrough for mobile application policy.

BACKGROUND

A vehicle may allow for third-party mobile applications to integrate voice commands into the vehicle human-machine interface (HMI). By doing so, the third-party applications may be controllable via the HMI of the vehicle. However, some third-party applications may not be suitable for use when the vehicle is in motion, or may be restricted according to government regulations.

SUMMARY

In a first illustrative embodiment, a system includes an infotainment system of a vehicle. The infotainment system is programmed to communicate with a primary mobile device over a first connection established between the infotainment system and an application integration component of a first vehicle-enabled application of the primary mobile device; communicate with a secondary mobile device over the first connection established between the infotainment system and the application integration component of the first vehicle-enabled application, the secondary mobile device being in communication with the primary mobile device over a second connection established between a device bridge component of the first vehicle-enabled application and a device bridge component of a second vehicle-enabled application; validate permission to execute a remote procedure call as requested by the first vehicle-enabled application over the first connection, using permissions assigned to the first vehicle-enabled application according to a policy table of the vehicle; and validate permission to execute the remote procedure call as requested by the second vehicle-enabled application over the second connection as forwarded to vehicle over the first connection, using permissions assigned to the second vehicle-enabled application according to the policy table of the vehicle.

In a second illustrative embodiment, a method for an infotainment system of a vehicle includes communicating with a primary mobile device over a first connection established between the infotainment system and an application integration component of a first vehicle-enabled application of the primary mobile device; communicating with a secondary mobile device over the first connection established between the infotainment system and the application integration component of the first vehicle-enabled application, the secondary mobile device being in communication with the primary mobile device over a second connection established between a device bridge component of the first vehicle-enabled application and a device bridge component of a second vehicle-enabled application; validating permission to execute a remote procedure call as requested by the first vehicle-enabled application over the first connection, using permissions assigned to the first vehicle-enabled application according to a policy table of the vehicle; and validating permission to execute the remote procedure call as requested by the second vehicle-enabled application over the second connection as forwarded to vehicle over the first connection, using permissions assigned to the second vehicle-enabled application according to the policy table of the vehicle.

In a third illustrative embodiment, a non-transitory computer-readable medium includes instructions that when executed by an infotainment system of a vehicle cause the infotainment system to perform operations including to communicate with a primary mobile device over a first connection established between the infotainment system and an application integration component of a first vehicle-enabled application of the primary mobile device; communicate with a secondary mobile device over the first connection established between the infotainment system and the application integration component of the first vehicle-enabled application, the secondary mobile device being in communication with the primary mobile device over a second connection established between a device bridge component of the first vehicle-enabled application and a device bridge component of a second vehicle-enabled application; validate permission to execute a remote procedure call as requested by the first vehicle-enabled application over the first connection, using permissions assigned to the first vehicle-enabled application according to a policy table of the vehicle; and validate permission to execute the remote procedure call as requested by the second vehicle-enabled application over the second connection as forwarded to vehicle over the first connection, using permissions assigned to the second vehicle-enabled application according to the policy table of the vehicle.

DETAILED DESCRIPTION

Figure 1:
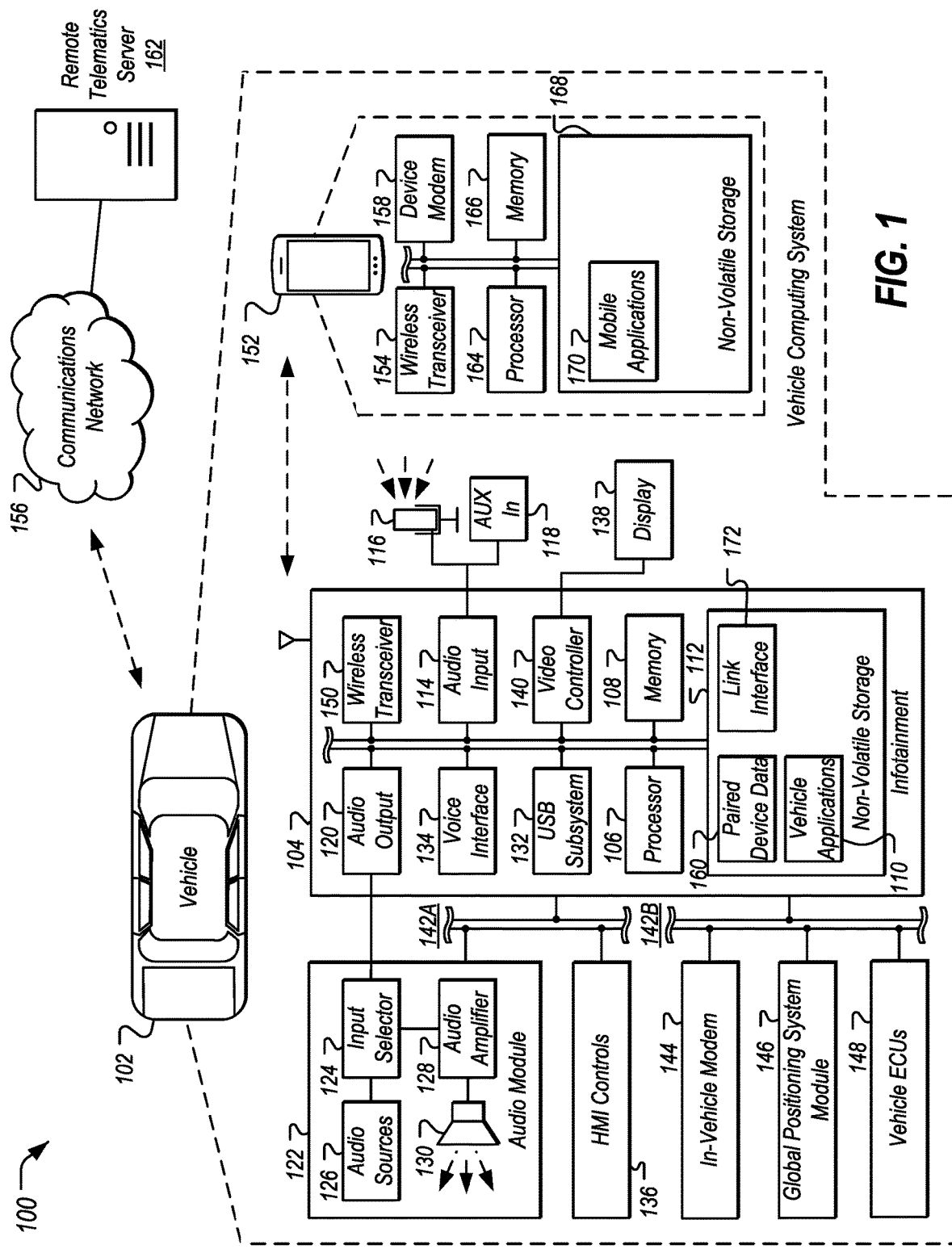
FIG. 1 illustrates an example diagram of a system configured to provide telematics services to a vehicle.

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

A mobile application executed by a mobile device connected to a vehicle may utilize features of the vehicle. In an example, the user may execute a navigation application on the mobile phone, where the application is displayed to the user in the vehicle infotainment system. The vehicle may authenticate the application using one or more security mechanisms. For instance, each application may be associated with an application identifier, and the vehicle may validate that the application identifier is included on a list of identifiers of applications that are allowed to communicate with the vehicle. As another possibility, each application may be associated with particular vehicle features (e.g., remote procedure calls (RPC)) to which the application is authorized, and the vehicle may validate the commands the application sends to the vehicle to ensure that the application is making calls that are indicated as being allowable.

When the application registers in-vehicle with the vehicle infotainment system, the application provides the application identifier to the vehicle. Either the vehicle infotainment system or the application may request a new policy table. This policy table may be fetched from a policy server by the application executed on the mobile device and shared with the vehicle infotainment system for validation. The vehicle infotainment system may then check the policy table shared to the vehicle infotainment system from the policy server to identify an application policy associated with the provided application identifier. The application policy may dictate whether the application is allowed to run using the vehicle, and if so, which features the application is granted with the vehicle computing system. If the policy table file does not contain policy permissions for the application identifier, the vehicle computing system may request a policy table file update from the policy server. The updated policy table file provided by the server may include updated policy permissions and other application information.

A passenger of a vehicle may pair his or her mobile device with the vehicle to gain application access to the vehicle features. Another passenger may enter the vehicle with a second mobile device that is not paired to the vehicle. This paired device may be referred to as a primary device, while the unpaired deice may be referred to as a secondary device.

In some use cases, it may be desirable for both mobile devices to be able to communicate with the vehicle. This may be accomplished, for example, by allowing the primary device to act as a conduit for communications between the secondary mobile device and the vehicle. In particular, a vehicle-enabled application executed by the primary device may serve as this conduit. However, as each application has its own set of permissions, the permissions of the applications executed by the secondary device may be limited to the permissions of the application of the primary device serving as the conduit. For example, if the conduit application is a music application, navigation requests from the secondary device would be denied because the music application has no permissions to send "SendLocation" remote procedure call (RPC) requests per the policy server. However, if the only vehicle-enabled applications on the primary device are music applications, it may still be desirable to permit a navigation request from the secondary device to be passed to the infotainment system as expected. Moreover, it would be undesirable to allow a music application access to such RPCs, as that could lead to an exploit of permissions being granted to applications that should not require those vehicle services.

The vehicle infotainment system may be improved to allow for any vehicle-enabled application to serve as a passthrough app. A new predefined protocol (e.g., an RPC) may be added to the vehicle infotainment system to allow for encrypted RPC requests from external peer-to-peer connected devices to send any unique RPC request with additional flexible data.

Upon a peer-to-peer connection being established between the secondary mobile device and the primary mobile device (e.g., via BLE), an application on the secondary device may send registration RPCs to the vehicle infotainment system, through the primary device, such as initializing an encryption handshake (RegisterAppInterface), requesting a policy table from the policy servers (OnPermissionChange). The session may be encrypted, to prevent the conduit application from being able to snoop on the data exchange.

The secondary device application may not be directly registered with the vehicle like a traditional vehicle-enabled application; however, the applications of the secondary device may send encrypted RPC requests to the vehicle infotainment system. The primary device may deliver these requested encrypted RPCs to the vehicle infotainment system, without the ability to intercept nor decrypt the message. The operations for the vehicle infotainment system to decrypt and execute the RPC included would follow the normal flow of data for vehicle-enabled applications, as if the vehicle-enabled applications on the secondary device had been executed by the primary device. Further aspects of the disclosure are described in detail herein.

FIG. 1 illustrates an example diagram of a system 100 configured to provide telematics services to a vehicle 102. The vehicle 102 may include various types of passenger vehicle, such as crossover utility vehicle (CUV), sport utility vehicle (SUV), truck, recreational vehicle (RV), boat, plane or other mobile machine for transporting people or goods. Telematics services may include, as some non-limiting possibilities, navigation, turn-by-turn directions, vehicle health reports, local business search, accident reporting, and hands-free calling. In an example, the system 100 may include the SYNC system manufactured by The Ford Motor Company of Dearborn, Mich. It should be noted that the illustrated system 100 is merely an example, and more, fewer, and/or differently located elements may be used.

The infotainment system 104 may include one or more processors 106 configured to perform instructions, commands and other routines in support of the processes described herein. For instance, the infotainment system 104 may be configured to execute instructions of vehicle applications 110 to provide features such as navigation, accident reporting, satellite radio decoding, and hands-free calling. Such instructions and other data may be maintained in a non-volatile manner using a variety of types of computer-readable storage medium 112. The computer-readable medium 112 (also referred to as a processor-readable medium or storage) includes any non-transitory medium (e.g., a tangible medium) that participates in providing instructions or other data that may be read by the processor 106 of the infotainment system 104. Computer-executable instructions may be compiled or interpreted from computer programs created using a variety of programming languages and/or technologies, including, without limitation, and either alone or in combination, Java, C, C++, C#, Objective C, Fortran, Pascal, Java Script, Python, Perl, and PL/SQL.

The infotainment system 104 may be provided with various features allowing the vehicle occupants to interface with the infotainment system 104. For example, the infotainment system 104 may include an audio input 114 configured to receive spoken commands from vehicle occupants through a connected microphone 116, and auxiliary audio input 118 configured to receive audio signals from connected devices. The auxiliary audio input 118 may be a physical connection, such as an electrical wire or a fiber optic cable, or a wireless input, such as a BLUETOOTH audio connection. In some examples, the audio input 114 may be configured to provide audio processing capabilities, such as pre-amplification of low-level signals, and conversion of analog inputs into digital data for processing by the processor 106.

The infotainment system 104 may also provide one or more audio outputs 120 to an input of an audio module 122 having audio playback functionality. In other examples, the infotainment system 104 may provide the audio output to an occupant through use of one or more dedicated speakers (not illustrated). The audio module 122 may include an input selector 124 configured to provide audio content from a selected audio source 126 to an audio amplifier 128 for playback through vehicle speakers 130 or headphones (not illustrated). The audio sources 126 may include, as some examples, decoded amplitude modulated (AM) or frequency modulated (FM) radio signals, and audio signals from compact disc (CD) or digital versatile disk (DVD) audio playback. The audio sources 126 may also include audio received from the infotainment system 104, such as audio content generated by the infotainment system 104, audio content decoded from flash memory drives connected to a universal serial bus (USB) subsystem 132 of the infotainment system 104, and audio content passed through the infotainment system 104 from the auxiliary audio input 118.

The infotainment system 104 may utilize a voice interface 134 to provide a hands-free interface to the infotainment system 104. The voice interface 134 may support speech recognition from audio received via the microphone 116 according to grammar associated with available commands, and voice prompt generation for output via the audio module 122. The voice interface 134 may utilize probabilistic voice recognition techniques using the grammar in comparison to the input speech. In many cases, the voice interface 134 may include a standard user profile tuning for use by the voice recognition functions to allow the voice recognition to be tuned to provide good results on average, resulting in positive experiences for the maximum number of initial users. In some cases, the system may be configured to temporarily mute or otherwise override the audio source specified by the input selector 124 when an audio prompt is ready for presentation by the infotainment system 104 and another audio source 126 is selected for playback.

The infotainment system 104 may also receive input from human-machine interface (HMI) controls 136 configured to provide for occupant interaction with the vehicle 102. For instance, the infotainment system 104 may interface with one or more buttons or other HMI controls configured to invoke functions on the infotainment system 104 (e.g., steering wheel audio buttons, a push-to-talk button, instrument panel controls, etc.). The infotainment system 104 may also drive or otherwise communicate with one or more displays 138 configured to provide visual output to vehicle occupants by way of a video controller 140. In some cases, the display 138 may be a touch screen further configured to receive user touch input via the video controller 140, while in other cases the display 138 may be a display only, without touch input capabilities.

The infotainment system 104 may be further configured to communicate with other components of the vehicle 102 via one or more in-vehicle networks 142. The in-vehicle networks 142 may include one or more of a vehicle controller area network (CAN), an Ethernet network, and a media oriented system transfer (MOST), as some examples. The in-vehicle networks 142 may allow the infotainment system 104 to communicate with other vehicle 102 systems, such as a vehicle modem 144 (which may not be present in some configurations), a global positioning system (GPS) module 146 configured to provide current vehicle 102 location and heading information, and various vehicle ECUs 148 configured to corporate with the infotainment system 104. As some non-limiting possibilities, the vehicle ECUs 148 may include a powertrain control module configured to provide control of engine operating components (e.g., idle control components, fuel delivery components, emissions control components, etc.) and monitoring of engine operating components (e.g., status of engine diagnostic codes); a body control module configured to manage various power control functions such as exterior lighting, interior lighting, keyless entry, remote start, and point of access status verification (e.g., closure status of the hood, doors and/or trunk of the vehicle 102); a radio transceiver module configured to communicate with key fobs or other local vehicle 102 devices; and a climate control management module configured to provide control and monitoring of heating and cooling system components (e.g., compressor clutch and blower fan control, temperature sensor information, etc.).

As shown, the audio module 122 and the HMI controls 136 may communicate with the infotainment system 104 over a first in-vehicle network 142-A, and the vehicle modem 144, GPS module 146, and vehicle ECUs 148 may communicate with the infotainment system 104 over a second in-vehicle network 142-B. In other examples, the infotainment system 104 may be connected to more or fewer in-vehicle networks 142. Additionally or alternately, one or more HMI controls 136 or other components may be connected to the infotainment system 104 via different in-vehicle networks 142 than shown, or directly without connection to an in-vehicle network 142.

The infotainment system 104 may also be configured to communicate with mobile devices 152 of the vehicle occupants. The mobile devices 152 may be any of various types of portable computing device, such as cellular phones, tablet computers, smart watches, laptop computers, portable music players, or other devices capable of communication with the infotainment system 104. In many examples, the infotainment system 104 may include a wireless transceiver 150 (e.g., a BLUETOOTH module, a ZIGBEE transceiver, a Wi-Fi transceiver, an IrDA transceiver, an RFID transceiver, etc.) configured to communicate with a compatible wireless transceiver 154 of the mobile device 152. Additionally or alternately, the infotainment system 104 may communicate with the mobile device 152 over a wired connection, such as via a USB connection between the mobile device 152 and the USB subsystem 132. In some examples the mobile device 152 may be battery powered, while in other cases the mobile device 152 may receive at least a portion of its power from the vehicle 102 via the wired connection.

The communications network 156 may provide communications services, such as packet-switched network services (e.g., Internet access, VoIP communication services), to devices connected to the communications network 156. An example of a communications network 156 may include a cellular telephone network. Mobile devices 152 may provide network connectivity to the communications network 156 via a device modem 158 of the mobile device 152. To facilitate the communications over the communications network 156, mobile devices 152 may be associated with unique device identifiers (e.g., mobile device numbers (MDNs), Internet protocol (IP) addresses, etc.) to identify the communications of the mobile devices 152 over the communications network 156. In some cases, occupants of the vehicle 102 or devices having permission to connect to the infotainment system 104 may be identified by the infotainment system 104 according to paired device data 160 maintained in the storage medium 112. The paired device data 160 may indicate, for example, the unique device identifiers of mobile devices 152 previously paired with the infotainment system 104 of the vehicle 102, secret information shared between the paired device and the infotainment system 104 such as link keys, and/or personal identification numbers (PINs), and most recently used or device priority information, such that the infotainment system 104 may automatically reconnect to the mobile devices 152 matching data in the paired device data 160 without user intervention.

When a mobile device 152 that supports network connectivity is connected to the infotainment system 104, the mobile device 152 may allow the infotainment system 104 to use the network connectivity of the device modem 158 to communicate over the communications network 156 with the remote telematics server 162 or other remote computing device. In one example, the infotainment system 104 may utilize a data-over-voice plan or data plan of the mobile device 152 to communicate information between the infotainment system 104 and the communications network 156. Additionally or alternately, the infotainment system 104 may utilize the vehicle modem 144 to communicate information between the infotainment system 104 and the communications network 156, without use of the communications facilities of the mobile device 152.

Similar to the infotainment system 104, the mobile device 152 may include one or more processors 164 configured to execute instructions of mobile applications loaded to a memory 166 of the mobile device 152 from storage medium 168 of the mobile device 152. In some examples, the mobile applications may be configured to communicate with the infotainment system 104 via the wireless transceiver 154 and with the remote telematics server 162 or other network services via the device modem 158. The infotainment system 104 may also include a device link interface 172 to facilitate the integration of functionality of the mobile applications into the grammar of commands available via the voice interface 134. The device link interface 172 may also provide the mobile applications with access to vehicle functions and information available to the infotainment system 104 via the in-vehicle networks 142. An example of a device link interface 172 may be the SYNC APPLINK component of the SYNC system provided by The Ford Motor Company of Dearborn, Mich.

Figure 2:
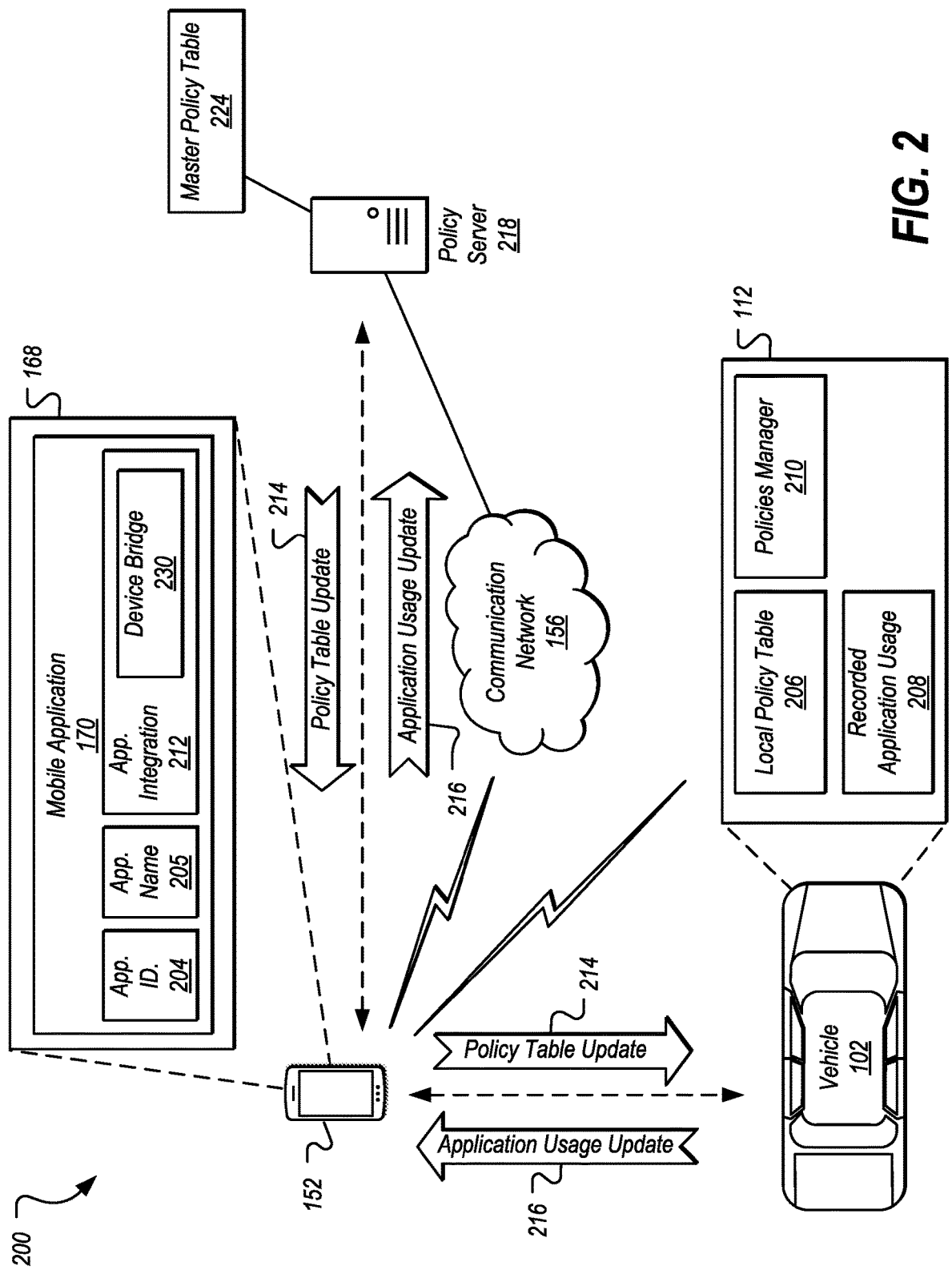
FIG. 2 illustrates an example diagram of an application policies architecture.

FIG. 2 illustrates an example diagram of an application policies architecture 200. As illustrated, the architecture 200 includes a vehicle 102 having a policies manager 210 in communication with a backend server 218 via the communications network 156. The policies manager 210 may be configured to maintain a local policy table 206 and recorded application usage 208. The mobile device 152 may execute a mobile application 170 associated with an application identifier 204 and including an application integration 212 component facilitating communication with a policy server 218 by way of the communications network 156. The policy server 218 may be configured to maintain a master policy table 224, as well as to provide policy table updates 214 to the vehicle 102 via the application integration 212 of the mobile device 152.

As noted above, mobile application 170 may be an application installed to the mobile device 152 for use with the infotainment system 104 of the vehicle 102. In an example, the mobile application 170 may add functionality to the infotainment system 104 by integrating voice commands controlling the functionality of the mobile application 170 with the voice interface 134 of the infotainment system 104. The mobile application 170 may be further configured to utilize user interface features of the infotainment system 104, such as the display 138 or the vehicle speakers 130, to provide information to vehicle occupants. In an example, the mobile application 170 may be a navigation application. In another example, the mobile application 170 may be a streaming media player application. As yet another possibility, the mobile application 170 may further provide for diagnostics or vehicle reporting functionality by transferring information retrieved from the vehicle 102 to a remote server for analysis.

The application identifier 204 may be a unique number or alphanumeric string assigned to a mobile application 170. In some cases, the application identifier 204 may be randomly-generated value. In other cases, the application identifier 204 may be assigned to the mobile application 170 by an authority configured to manage the application identifiers 204. The application name 205 may be a friendly user-readable name of the application 170 that may be used by the application 170 for identification in the user interface or within other contexts where identification of the application by the application identifier 204 may be undesirable.

As different mobile applications 170 perform different functions, it may be desirable for them to have different levels of permissions to use the features of the vehicle 102. For instance, a streaming media application may not require access to navigation system RPCs, but a navigation application may. The local policy table 206 may be configured to store key information detailing application permissions in the vehicle 102. Thus, the local policy table 206 may define the type of interaction that is allowed between the infotainment system 104 and a given mobile application 170. In an example, the local policy table 206 may include permission information for the mobile applications 170 keyed according to the application identifiers 204 assigned to the mobile applications 170.

The permission information may include, for example, a listing of RPCs and vehicle 102 systems that are deemed allowable for use by the mobile applications 170. As some specific examples, the local policy table 206 may include permission information with respect to remote procedure calls of the infotainment system 104 that are allowable for access by the mobile application 170, such as to stream audio using the audio module 122, use the display 138, receive input from the HMI controls 136, or to retrieve a current GPS location of the vehicle 102. As some other examples, the local policy table 206 may include permission information with respect whether the mobile application 170 has permission to perform a context switch and take focus from another application, e.g., to interrupt the radio to provide a message. As yet a further example, the local policy table 206 may include permission information with respect whether the mobile application 170 may execute scripts on the infotainment system 104. As an even a further example, the local policy table 206 may include permission information with respect to which vehicle 102 functions may be utilized when the vehicle 102 is parked or stationary, and which may be used when the vehicle 102 is in motion. The local policy table 206 may also include information to configure how and when the vehicle 102 requests updates to the local policy table 206, as well as information regarding how to contact a source of updated local policy tables 206 (e.g., a URL or other address of the policy server 218).

The recorded application usage 208 may include logged usage of the RPCs and vehicle 102 system usage, or other vehicle 102 functions whose permission is controlled for the mobile applications 170. Thus, the recorded application usage 208 may include collected usage data regarding how users are using the mobile applications 170 in the vehicle 102. As with the local policy table 206, the recorded application usage 208 may be keyed according to the application identifiers 204 assigned to the mobile applications 170. In some examples, the recorded application usage 208 may be included within the local policy table 206, while in other examples the recorded application usage 208 may be maintained separate from the local policy table 206. As some specific examples of logged information, the recorded application usage 208 may include run attempts of the mobile application 170, errors experienced by the mobile application 170 (e.g., permission denied errors, unexpected errors such as those due to programming errors, etc.), logged HMI usage information (e.g., steering wheel control usage, voice command usage, etc.), and audible time during which the mobile application 170 provided audio through the vehicle 102 HMI.

The policies manager 210 may be configured to manage mobile application 170 permissions for the infotainment system 104 of the vehicle 102. In an example, the policies manager 210 may maintain the local policy table 206. When a mobile application 170 is initiated or activated, the policies manager 210 may identify the permissions associated with a mobile application 170 based on the local policy table 206. Moreover, when the mobile application 170 interacts with the infotainment system 104, the policies manager 210 may record the mobile application 170 usage of vehicle RPCs and vehicle 102 systems in the recorded application usage 208.

The policies manager 210 of the infotainment system 104 may be further configured to manage communication to the policy server 218. In terms of requests or responses between the policies manager 210 and the policy server 218, the policies manager 210 may be configured to initiate communications to the policy server 218. In an example, the policies manager 210 may provide a message to the policy server 218 to inform the policy server 218 that the vehicle 102 is on and listening for information. In some cases, the policy server 218 may address an unsolicited message to a specific vehicle 102 and push it to the cloud. However, the message may not be delivered to the vehicle 102 until the infotainment system 104 connects and requests it from the policy server 218.

The policies manager 210 may be configured to request the policy server 218 to provide the vehicle 102 with updates to the local policy table 206. For instance, the policies manager 210 may request an update to the local policy table 206 if a mobile application 170 having an application identifier 204 not in the local policy table 206 attempts to integrate with the infotainment system 104 of the vehicle 102.

The policies manager 210 may be further configured to provide the recorded application usage 208 to the policy server 218 for remote review and processing. To do so, the policies manager 210 may provide an application usage update 216 message including the recorded application usage 208 information stored by the vehicle 102. This may allow the system to verify that the mobile application 170 is utilizing the RPCs and vehicle 102 systems appropriately, given the apparent purpose of the mobile application 170. For instance, it may be reasonable for a navigation mobile application 170 to periodically request speed information for the vehicle 102, but it may be unreasonable for an internet radio mobile application 170 to do so.

The application integration 212 may be configured to facilitate the communication of the policies manager 210 with the policy server 218. In an example, the application integration 212 may include a library or other code module compiled or linked into the mobile applications 170 and providing functionality to allow the policies manager 210 to communicate through the mobile applications 170 to the policy server 218. The policies manager 210 may accordingly utilize the application integration 212 to request policy table updates 214 via the policy server 218, provide application usage updates 216 to the policy server 218, receive policy table updates 214 from the policy server 218, and negotiate the communications between the mobile device 152 and the infotainment system 104. The policy table updates 214 may include, for example, a new local policy table 206 to replace the local policy table 206 currently stored by the policies manager 210, or updates to an existing local policy table 206 to augment the current entries of the local policy table 206. The application integration 212 may further include other functionality that may be useful for communication with the policy server 218, such as the ability to pass encrypted messages between the infotainment system 104 and the policy server 218. Thus, in some cases operations discussed herein related to the functioning of the mobile application 170 with respect to application polices generally, may be implemented by the application integration 212 code of the mobile application 170.

The wireless transceiver 115 of the vehicle 102 may be connected to a paired mobile device 152 (e.g. via a BLUETOOTH connection, via a USB connection, etc.), such that the communications features of the mobile device 152 may be used to allow the infotainment system 104 to communicate via the communications network 156 with the policy server 218. The communications network 156 may accordingly be utilized by the mobile device 152 via a cellular data plan of the mobile device 152 (e.g., to provide TCP/IP-based communications functionality to the infotainment system 104. Additionally or alternately, the infotainment system 104 may utilize the vehicle modem 144 to communicate data between the processor 106 and the communications network 156. Messages directed to the vehicle 102 via the communications network 156 may be queued in the cloud until a connection to the vehicle 102 can be established or until the message expires. In an example, the queuing and message expiration functionality may be implemented via the back-end server 218. The communications network 156 message queuing functionality may also act as a first line of defense against server denial-of-service attacks.

The policy server 218 may be configured to operate as a gateway between the communications network 156 and the internal application management infrastructure. In an example, the internal application management infrastructure may be managed by a manufacturer of the vehicles 102, while in another example the internal application management infrastructure may be managed by another party, such as an application certification entity. The policy server 218 may be configured to validate, transform, decrypt, encrypt, and otherwise process messages.

In one aspect, the policy server 218 may provide secure messaging services for messages to and from the policy server 218. When a message or request is received by the policy server 218, the policy server 218 process the message to using a key management system, where the message or request is authenticated, decrypted, and validated. As an example validation, the policy server 218 may validate messages against replay attacks by assigning message identifiers to outgoing messages and verify that appropriate message identifiers are included in incoming messages. If these operations are successful, the policy server 218 may retrieve the message payload from the message and route the message to an appropriate application according to a service type identified by the message. In an example, policy table messages (e.g., requests for policy table updates 214) may be associated with a service type indicating that the messages are to be routed to an application permissions service.

The policy server 218 may also be configured to receive application usage updates 216 from the vehicle 102, as well as to provide policy table updates 214 to the vehicle 102. In an example, the policy server 218 may receive a snapshot of a local policy table 206 of the vehicle 102 in an application usage update 216 message. The local policy table 206 may include recorded application usage 208 for mobile applications 170 having interacted with the vehicle 102. The policy server 218 may archive the recorded application usage 208 from the received local policy table 206 and may update the application permissions stored by the vehicle 102 by providing the vehicle 102 with a policy table update 214. The policy table update 214 may be based on latest information maintained by the policy server 218 in a master policy table 224 of the latest mobile application 170 permissions. In an example, each version of a mobile application 170 (e.g., version 2 vs. version 2.1) may be associated with its own permission information in the master policy table 224. Notably, the master policy table 224 information provided in the policy table update 214 to the vehicle 102 may lack any recorded application usage 208 data, but may include up-to-date permissions for any mobile applications 170 that were identified as being used by the vehicle 102 according to the received local policy table 206 of the application usage update 216.

The application integration 212 may also be configured to facilitate the communication of the mobile device 152 to other mobile devices 152. This may be accomplished through use of a bridge component 230 of the application integration 212. The bridge component 230 may include a bridge client and a bridge target. The bridge client may implement functionality enabling mobile applications 170 to control the infotainment system 104 paired with another device. For example, an unpaired mobile device 152 may access the infotainment system 104 through a paired mobile device 152 using the bridge client portion of the bridge component 230. The bridge target portion of the bridge component 230 implements functionality enabling the application executing on the paired device to facilitate control of the infotainment system 104 by the non-paired device.

Figure 3:
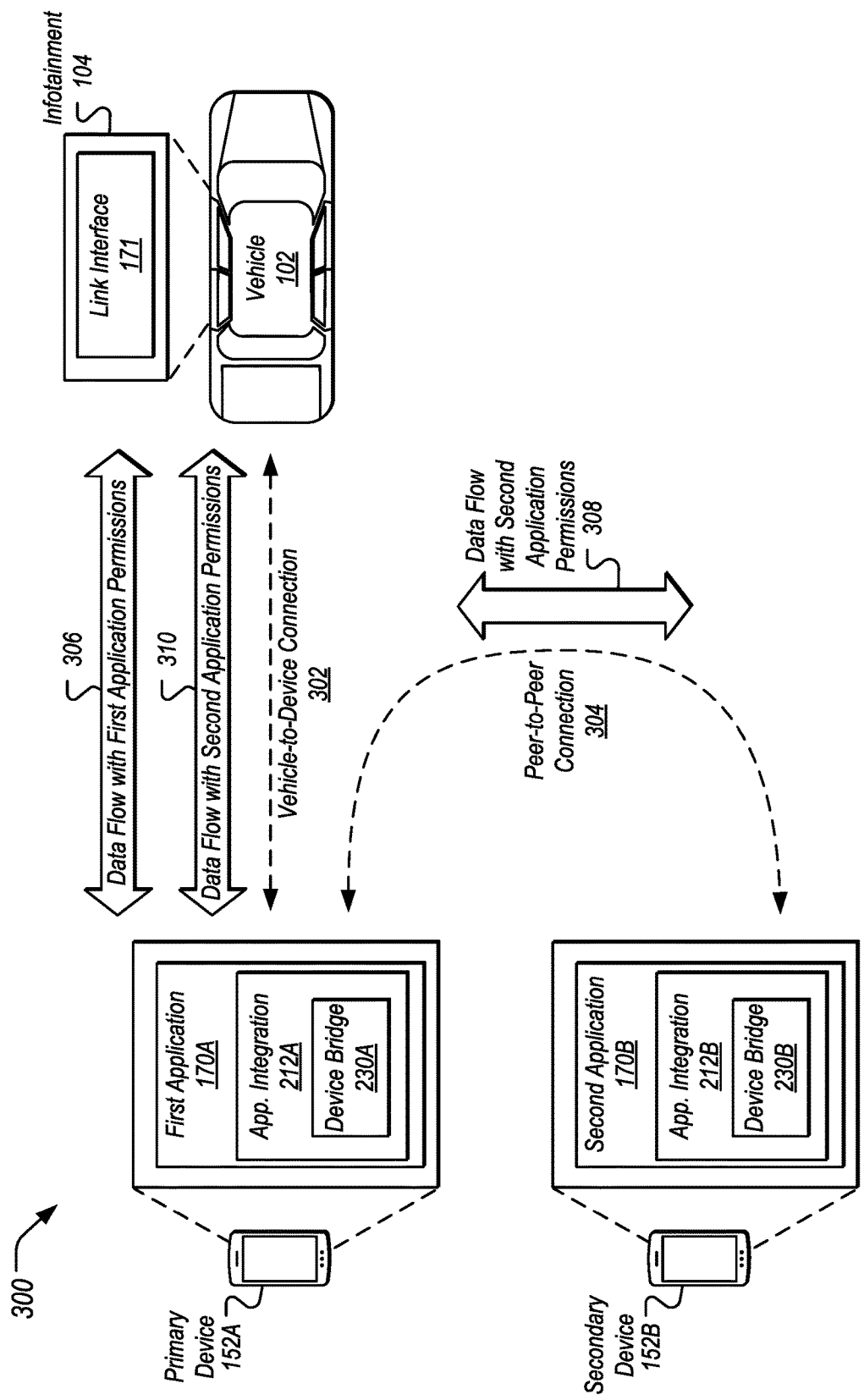
FIG. 3 illustrates an example of a primary device accessing the infotainment system as well as a secondary device utilizing the primary device to access the infotainment system.

FIG. 3 illustrates an example of a primary device 152A accessing the infotainment system 104 as well as a secondary device 152B utilizing the primary device 152A to access the infotainment system 104. This may involve the forming of two connections: a vehicle-to-device connection 302 between the vehicle 102 and the primary device 152A, and a peer-to-peer connection 304 between the primary device 152A and the secondary device 152B.

The vehicle-to-device connection 302 may be formed to provide access to the infotainment system 104 by applications 170 executing on the primary device 152A. This vehicle-to-device connection 302 may be implemented by the application integration 212 component of the primary device 152A in communication with the link interface 171 of the infotainment system 104. The pairing of the primary device 152A with the infotainment system 104 may include pairing the devices according to the BLUETOOTH protocol or coupling the primary device 152A infotainment system 104 by a cable (such as a universal serial bus (USB) cable), as some examples.

The peer-to-peer connection 304 may be formed between the primary device 152A and the secondary device 152B. This peer-to-peer connection 304 may be implemented by the device bridge 230 executed by the primary device 152A in communication with the device bridge 230 executed by the secondary device 152B. The peer-to-peer connection 304 may accordingly provide access to the infotainment system 104 by applications 170 executing on the secondary device 152B, by using the primary device 152A as an intermediary. The peer-to-peer connection 304 between the primary device 152A and the secondary device 152B may be performed over the BLUETOOTH protocol in an example, although other protocols such as WI-FI or even a wired connected may be used.

By using the vehicle-to-device connection 302 and the peer-to-peer connection 304, application data flows may be established between the primary device 152A and the vehicle 102, as well as between the secondary device 152B and the vehicle 102. For instance, a first application 170A executed by the primary device 152A may utilize a data flow 306 over the vehicle-to-device connection 302 with application permissions corresponding to the first application 170A, while a second application 170B executed by the secondary device 152B may utilize a data flow 308 over the peer-to-peer connection 304 with application permissions corresponding to the second application 170B along with a data flow 310 over the vehicle-to-device connection 302 with application permissions also corresponding to the second application 170B. This may accordingly allow the second application 170B to utilize the permissions that correspond to the second application 170B, regardless of that the vehicle-to-device connection 302 may be provided by the application integration 212 of the first application 170A.

Figure 4:
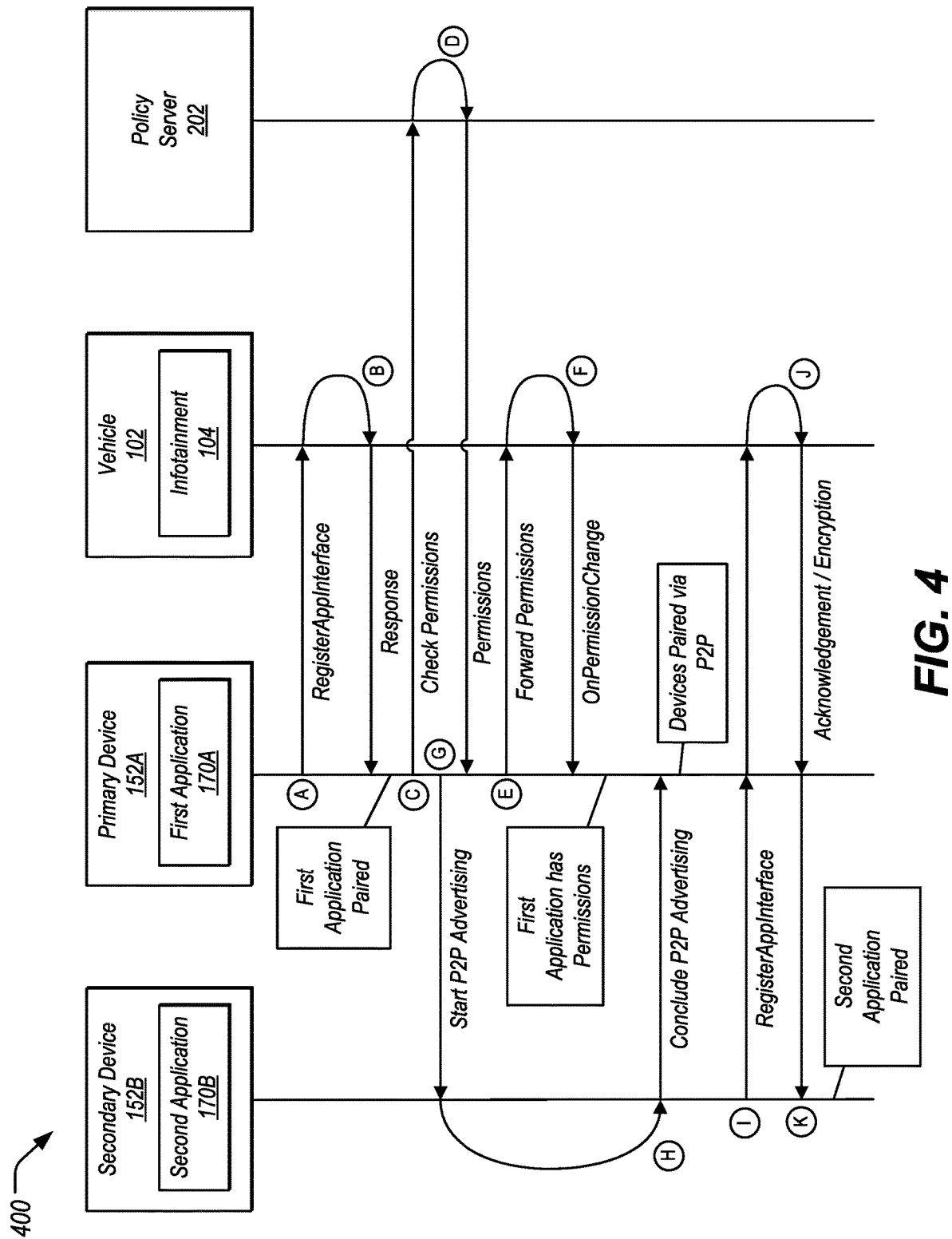
FIG. 4 illustrates an example data flow diagram for the registration of mobile applications of primary and secondary devices to the infotainment system.

FIG. 4 illustrates an example data flow 400 for the registration of mobile applications 170 of primary and secondary devices 152 to the infotainment system 104. As shown, the data flow 400 includes the registration of a first application 170A executed by the primary device 152A, as well as the registration of a second application 170B executed by the secondary device 152B.

At (A), the first application 170A of the primary device 152A initializes a handshake operation with the infotainment system 104. The handshake may be a result of the application integration 212 portion of the first application 170A calling the RegisterAppInterface RPC, which may be used to pair the primary device 152A executing the first application 170A with the infotainment system 104. The handshake request may result in a response being provided by the infotainment system 104 back to the first application 170A at (B), establishing the vehicle-to-device connection 302. The response may indicate to the first application 170A that the primary device 152A executing the first application 170A is paired to the infotainment system 104.

This handshake response may result in a check for permissions being performed by the infotainment system 104 at (C) for the first application 170A. For instance, the vehicle infotainment system 104 or the first application 170A may request a new policy table 206. This policy table 206 may be fetched from a policy server 218 by the first application 170A executed on the mobile device 152A and shared with the vehicle infotainment system 104 for validation. The check for permissions may include a request at (C) from the primary device 152A to the policy server 202 for the policy table 206 information including permission information for applications including the first application 170A (e.g., as specified in the policy table 206 for application identifier 204 of the first application 170A as discussed above). The policy server 202 may respond to the request with the permissions at (D), which may be received to the primary device 152A. The first application 170A may forward these permissions to the vehicle 102 at (E), which may result at (F) in the infotainment system 104 sending an OnPermissionChange call to the primary device 152A to inform the primary device 152A of the recognition of the permissions of the first application 170A. In the illustrated example, this action results in the first application 170A recognizing its permissions to utilize the RPCs of the infotainment system 104.

Also, as a result of the pairing at (C), the primary device 152A may, at (G), begin to advertise availability of the primary device 152A for connection to by secondary devices 152. At (H), the secondary device 152B may respond to the advertisement, which may establish peer-to-peer connection 304 between the secondary device 152B and the primary device 152A mentioned above. It is noted that flow of operations (G) and (H) is shows as occurring simultaneous to aspects of the permissions flow from (C) through (F), but in other examples the ordering of the operations (C) through (H) may vary. For instance, the initiation of P2P advertising may be deferred until permissions have been established in other examples.

Similar to the handshake operation with the infotainment system 104 performed by the first application 170A executed by the primary device 152A, at (I) a handshake operation with the infotainment system 104 may be performed by the second application 170B executed by the secondary device 152B. This second handshake may be a result of the application integration 212 portion of the second application 170B calling the RegisterAppInterface RPC, which may be used to indirectly pair the secondary device 152B executing the second application 170B with the infotainment system 104. Notably, this pairing of the secondary device 152B may be performed over the tunnel via the first application 170A of the primary device 152A, e.g., the peer-to-peer connection 304 and the vehicle-to-device connection 302. This second handshake request may result in a response being provided by the infotainment system 104 back to the second application 170B via the tunnel at (K). The response may indicate to the second application 170B that the secondary device 152B executing the second application 170B is paired to the infotainment system 104.

This handshake response may result in a check for permissions being performed by the infotainment system 104 for the second application 170B. For instance, the infotainment system 104 may identify the permissions available to the second application 170B by accessing the permissions for the application identifier 204 for the secondary device 152B included in the policy table 206. For instance, the infotainment system 104 may send an OnPermissionChange call to the secondary device 152B to inform the secondary device 152B of the recognition of the permissions of the second application 170B (not shown in FIG. 4, but similarly shown at (Q) in FIG. 5). Thus, using the permissions table 206, the second application 170B may also recognize its permissions to utilize the RPCs of the infotainment system 104.

Figure 5:
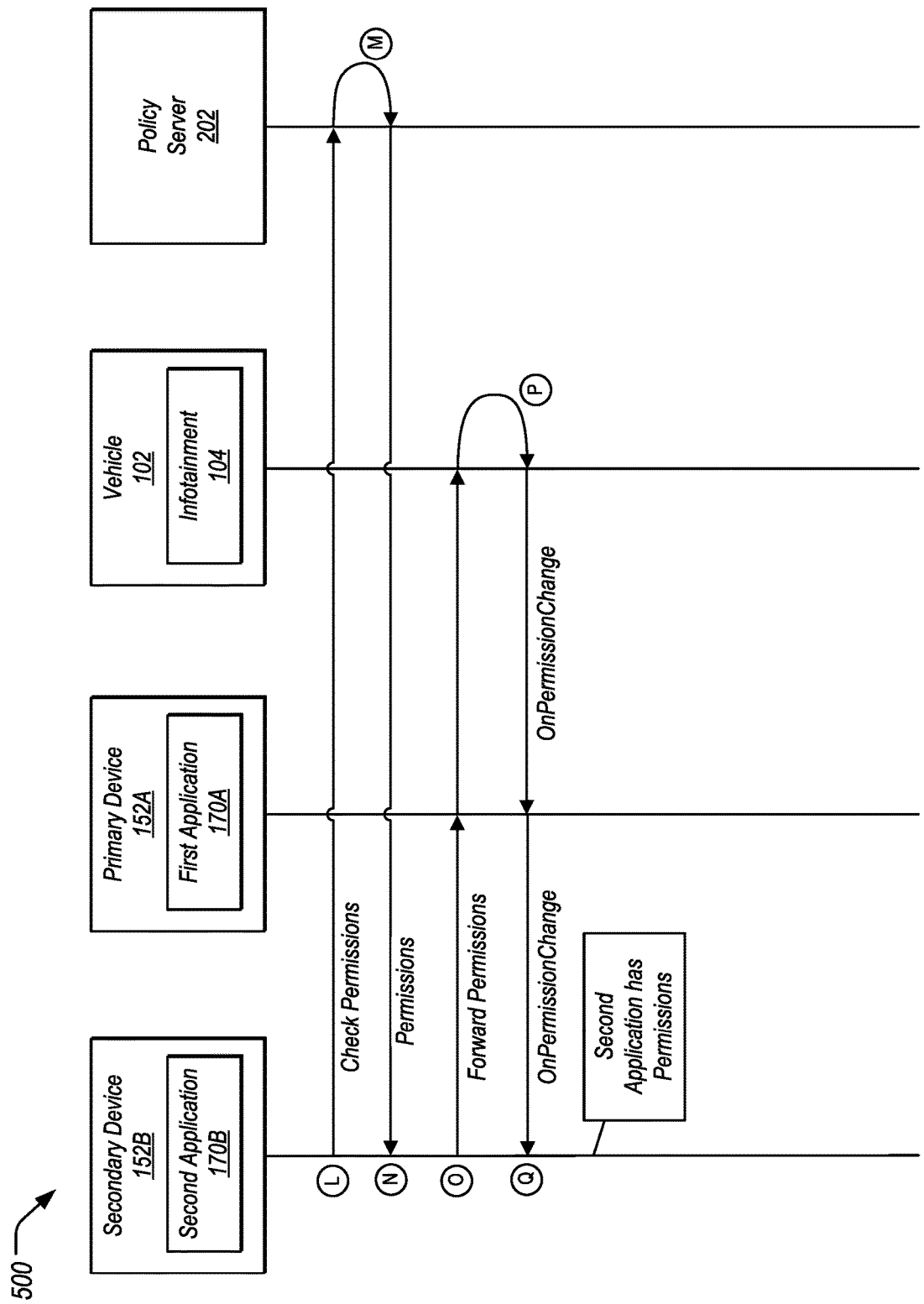
FIG. 5 illustrates an example data flow for the request of permissions that are not indicated in the policy table for the secondary device.

FIG. 5 illustrates an example data flow 500 for the request of permissions that are not indicated in the policy table 206 for the secondary device 152B. This may occur, for example, if information about the second application 170B is not indicated in the current policy table 206. In such a case, at (L) the second application 170B, may utilize the secondary device 152B to request a new policy table 206 for permission information for applications including the first application 170B (e.g., as specified by including an application identifier 204 of the second application 170B in the request as discussed above). This communication may, as shown, preferably be done without use of the tunnel to the primary device 152A to ensure security of the permission information. In other examples, it is also possible that the primary device 152A may request the policy table 206 via the primary device 152A. Regardless, the policy server 202 may respond to the request with the permissions at (M), which may be received to the secondary device 152B at (N). The second application 170B may forward these permissions via the tunnel to the vehicle 102 at (O), which may result at (P) in in the infotainment system 104 sending an OnPermissionChange call to the secondary device 152B via the primary device 152A to inform the secondary device 152B of the permissions of the second application 170B. For instance, this data may be sent over the data flow 310 via the vehicle-to-device connection 302 and then over the data flow 308 over the peer-to-peer connection 304. This information may be sent to the secondary device 152B in encrypted form, to avoid potential security issues with the primary device 152A having access to the data. In the illustrated example, this action results in the second application 170B recognizing its permissions to utilize the RPCs of the infotainment system 104.

Figure 6:
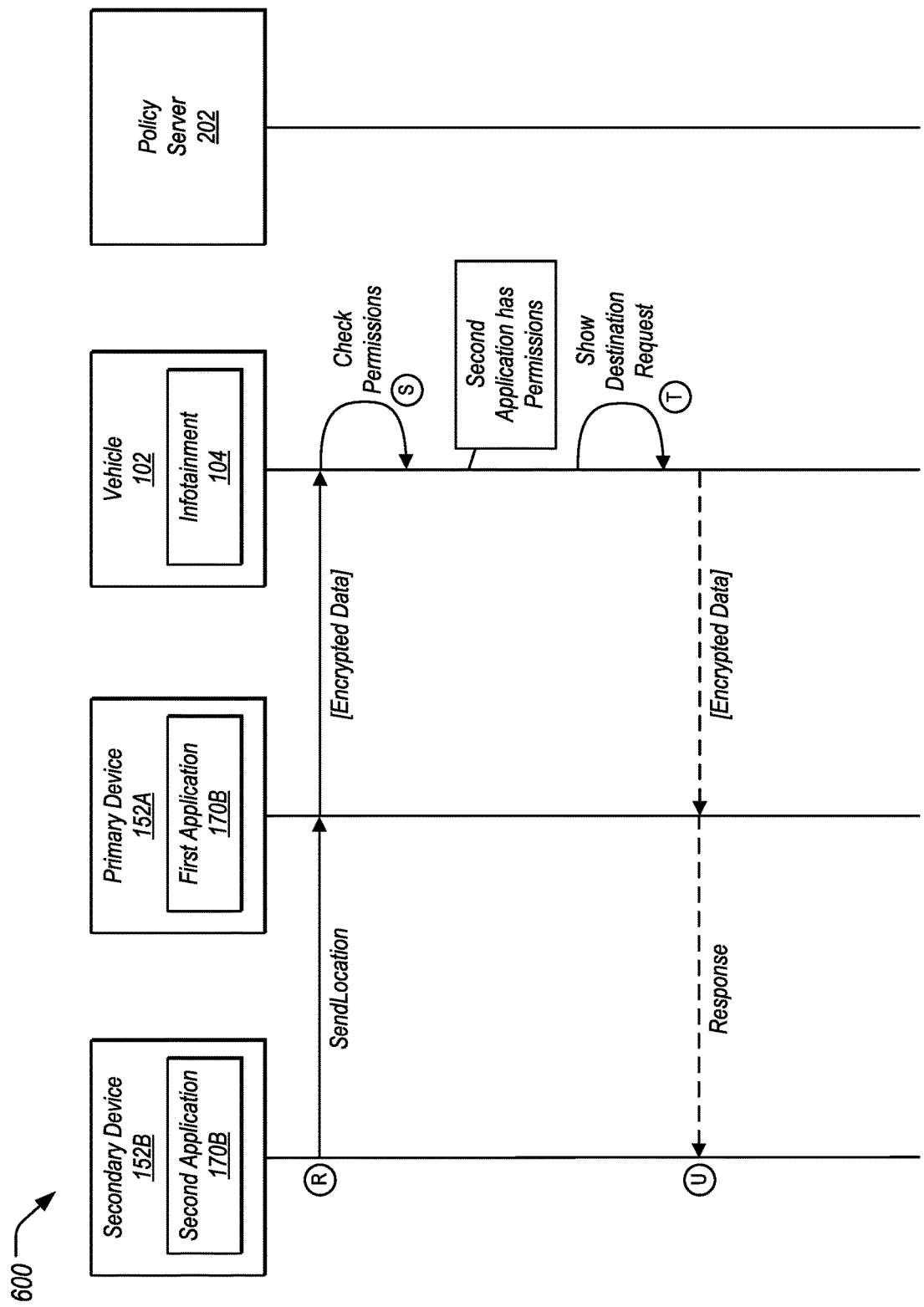
FIG. 6 illustrates an example data flow for the use of a remote procedure call of the infotainment system by the secondary device.

FIG. 6 illustrates an example data flow 600 for the use of an RPC of the infotainment system 104 by the secondary device 152B. As shown at (R), the second application 170B executed by the secondary device 152B attempts to use the SendLocation RPC in this example. This call is provided over the peer-to-peer connection 304 to the primary device 152A, which in turn provides the call to the infotainment system 104 over the vehicle-to-device connection 302. At (S), the vehicle 102 checks the permissions of the user of the RPC in accordance with the permissions for the second application 170B. Notably, the context of the second application 170B is used by the infotainment system 104, despite the call having originated from a connection through the first application 170A.

In the illustrated example, the second application 170B has permission to use the SendLocation RPC. This may be confirmed through access by the infotainment system 104 to the permissions for the second application 170B as specified by the local policy table 206. As the second application 170B has permission, the infotainment system 104 may process the request. For instance, as shown at (T) the infotainment system 104 shows a destination request for the location provided by the SendLocation call. This destination request may, in an example, take the form of a prompt to the driver of the vehicle 102 (e.g., requesting confirmation to navigate to the location specified by the destination request or to queue up the destination location). In some examples, as further shown at (U), a response to the SendLocation RPC may be provided back to the second application 170B to allow the second application 170B to confirm that the request was successful.

Figure 7:
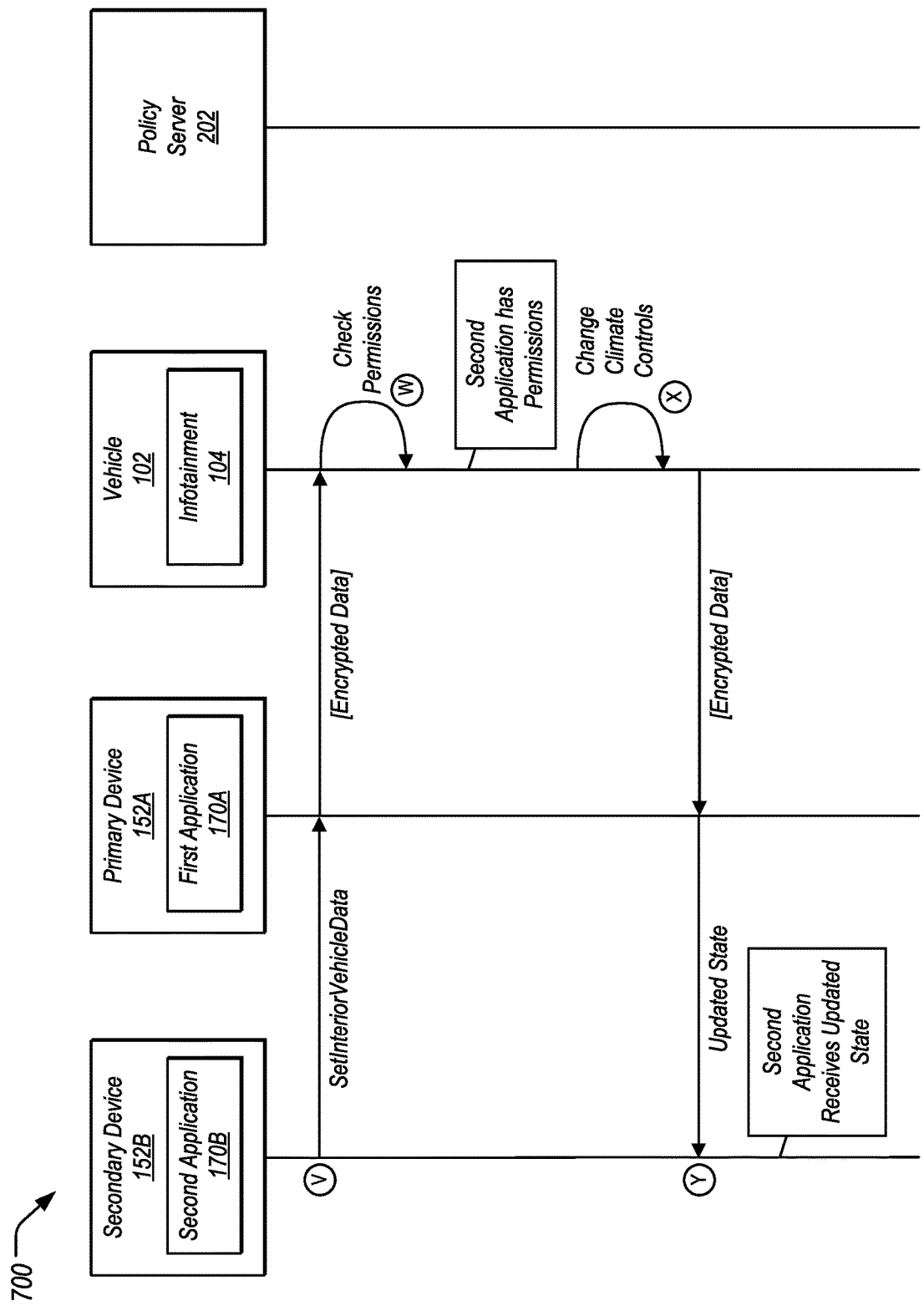
FIG. 7 illustrates an example data flow for the use of another remote procedure call of the infotainment system by the secondary device.

FIG. 7 illustrates an example data flow 700 for the use of another RPC of the infotainment system 104 by the secondary device 152B. As shown at (V), the second application 170B executed by the secondary device 152B attempts to use the SetInteriorVehicleData RPC. This call is again provided over the peer-to-peer connection 304 to the primary device 152A, which in turn provides the call to the infotainment system 104 over the vehicle-to-device connection 302. At (W), the vehicle 102 similarly checks the permissions of the user of the RPC in accordance with the permissions for the second application 170B.

In the illustrated example, the second application 170B also has permission to use the SetInteriorVehicleData RPC. This may be confirmed through access by the infotainment system 104 to the permissions for the second application 170B as specified by the local policy table 206. As the second application 170B has permission, the infotainment system 104 may process the request. For instance, as shown at (X) the infotainment system 104 changes climate control settings that are specified by the SetInteriorVehicleData call. As further shown at (Y), a response to the SetInteriorVehicleData RPC is provided back to the second application 170B to allow the second application 170B to receipt the updated state of the vehicle 102. This information may be used, for example, to allow the second application 170B to update its user interface to show the current climate control settings.

Figure 8:
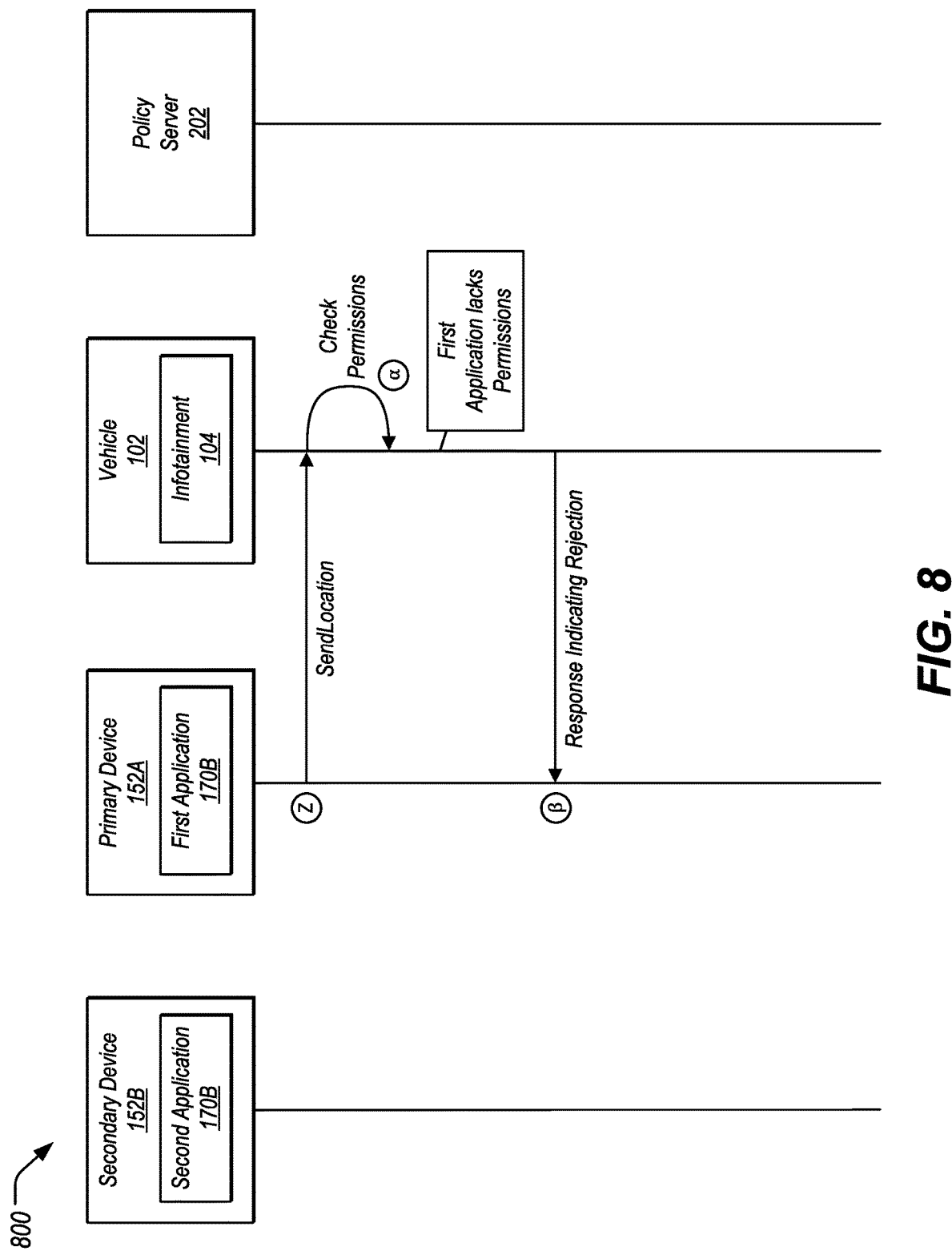
FIG. 8 illustrates an example data flow for the use of a remote procedure call of the infotainment system by the primary device.

FIG. 8 illustrates an example data flow 800 for the use of an RPC of the infotainment system 104 by the primary device 152A. As shown at (Z), the first application 170A executed by the primary device 152A attempts to use the SendLocation RPC. This call is provided to the infotainment system 104 over the vehicle-to-device connection 302. At (α), the vehicle 102 checks the permissions of the user of the RPC in accordance with the permissions for the second application 170B. Notably, the context of the first application 170A is used by the infotainment system 104. In the illustrated example, the first application 170A lacks permission to use the SendLocation RPC. This may be confirmed through access by the infotainment system 104 to the permissions for the first application 170A as specified by the local policy table 206. As the first application 170A lacks permission, the infotainment system 104 may deny the request. For instance, as shown at (β) the infotainment system 104 provides a response back to the first application 170A indicating the lack of permission of the first application 170A to utilize the SendLocation RPC.

Thus, using the peer-to-peer connection 304 established between the secondary device 152B and the primary mobile device 152 (e.g., via BLE), an application 170 on the secondary device 152B may send registration RPCs to the vehicle infotainment system 104, through the primary device 152A, such as initializing an encryption handshake (RegisterAppInterface), requesting a policy table from the policy servers (OnPermissionChange). The session may be encrypted, to prevent the conduit application 170A of the primary device 152A from being able to snoop on the data exchange.

The secondary device application 170B may not be directly registered with the vehicle 102 like a traditional vehicle-enabled application 170A; however, the applications 170B of the secondary device 152B may send encrypted RPC requests to the vehicle infotainment system 104. The primary device 152A may deliver these requested encrypted RPCs to the vehicle infotainment system 104, without the ability to intercept nor decrypt the message. The operations for the vehicle infotainment system 104 to decrypt and execute the RPC included would follow the normal flow of data for vehicle-enabled applications 170A, as if the vehicle-enabled applications 170B on the secondary device 152B had been executed by the primary device 152A.

This system 100 accordingly allows for several permutations and combinations of a single primary device 152A with multiple secondary devices 152B, multiple applications 170B on a single secondary device 152B, or even multiple applications 170B on multiple secondary devices 152B. For example, with the primary device 152A only having a music player application 170A installed, multiple passengers in the vehicle with a navigation application 170B installed on their unique devices 152B, each passenger can send their own SendLocation request to the vehicle 102 through the primary device 152A. The primary device 152A can connect to multiple passenger secondary devices 152B through the bridge component 230. Each SendLocation request would be displayed by the infotainment system 104 in the order in which it was received.

In another scenario, a first passenger could be using the SendLocation RPC through a navigate application 170A installed to the first passenger's mobile device 152A, and a second passenger may be using a climate control application 170B installed to the second passenger's mobile device 152B that has the ability to adjust the climate settings in the vehicle 102. Assuming that the permissions have already been granted from the policy server 218, both passengers could send their RPCs (e.g., SendLocation, SetInteriorVehicleData) to the infotainment system 104 through the primary device 152A. The SendLocation request may be displayed to the driver, and the new updated climate control settings (e.g., new fan speed, new temperature) would update the system. The infotainment system 104 may display the new information to the driver dependent on the configuration of the specific vehicle 102.

While many examples herein relate to use of navigation permissions, it should be noted that this is merely an example, and other types of permissions discussed herein may be applicable as well, such as permission to utilize one or more of: driving characteristics (e.g., braking, steering wheel angle, etc.), vehicle location data, vehicle navigation destinations (e.g., SendLocation), keyboard input, touch input, and vehicle information (e.g., make, model, etc.).

Computing devices described herein, such as the infotainment system 104, mobile devices 152, and servers remote to the vehicle 102, generally include computer-executable instructions, where the instructions may be executable by one or more computing devices such as those listed above. Computer-executable instructions may be compiled or interpreted from computer programs created using a variety of programming languages and/or technologies, including, without limitation, and either alone or in combination, Java™, C, C++, C#, Visual Basic, Java Script, Perl, etc. In general, a processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of computer-readable media.

With regard to the processes, systems, methods, heuristics, etc., described herein, it should be understood that, although the steps of such processes, etc., have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claims.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A system comprising:
    an infotainment system of a vehicle, programmed to
        communicate with a primary mobile device over a first connection established between the infotainment system and an application integration component of a first vehicle-enabled application of the primary mobile device, the first vehicle-enabled application being assigned a first application identifier;
        communicate with a secondary mobile device over the first connection established between the infotainment system and the application integration component of the first vehicle-enabled application, the secondary mobile device being in communication with the primary mobile device over a second connection established between a device bridge component of the first vehicle-enabled application and a device bridge component of a second vehicle-enabled application of the secondary mobile device, the second vehicle-enabled application being assigned a second application identifier;
        validate permission to execute a remote procedure call as requested by the first vehicle-enabled application over the first connection, using first permissions assigned to the first application identifier of the first vehicle-enabled application according to a policy table of the vehicle; and
        validate permission to execute the remote procedure call as requested by the second vehicle-enabled application over the second connection as forwarded to the vehicle over the first connection via the first vehicle-enabled application as a passthrough, using second permissions assigned to the second application identifier of the second vehicle-enabled application according to the policy table of the vehicle,
        wherein the first permissions assigned to the first vehicle-enabled application by the policy table deny execution of the remote procedure call, the second permissions assigned to the second vehicle-enabled application by the policy table allow the execution of the remote procedure call, and the remote procedure call is allowed execution by the second vehicle-enabled application despite the remote procedure call from the second vehicle-enabled application being received over the first connection from the first vehicle-enabled application and the first vehicle-enabled application being denied permission.

2. The system of claim 1, wherein the remote procedure call requested by the first vehicle-enabled application is received over a first data flow provided over the first connection, the remote procedure call requested by the second vehicle-enabled application is received over a second data flow provided over the first connection, and the second data flow is encrypted by the secondary mobile device to prevent the primary mobile device from gaining access to contents of the second data flow.

3. The system of claim 1, wherein the infotainment system is further programmed to:
    communicate with another secondary mobile device over the first connection established between the infotainment system and the application integration component of the first vehicle-enabled application, the other secondary mobile device being in communication with the primary mobile device over a third connection established between the device bridge component of the first vehicle-enabled application and a device bridge component of a third vehicle-enabled application of the other secondary mobile device; and
    validate permission to execute the remote procedure call as requested by the third vehicle-enabled application over the first connection, using permissions assigned to the third vehicle-enabled application according to the policy table of the vehicle.

4. The system of claim 1, wherein the remote procedure call requires predefined permissions, the first vehicle-enabled application lacks the predefined permissions, and the second vehicle-enabled application has the predefined permissions.

5. The system of claim 4, wherein the predefined permissions include permission to utilize one or more of: driving characteristics, vehicle location data, vehicle navigation destinations, keyboard input, touch input, and vehicle information.

6. The system of claim 1, wherein the first vehicle-enabled application is a music application having music permissions but not navigation permissions, and the second vehicle-enabled application is a navigation application having navigation permissions, and the remote procedure call is a send location navigation request requiring navigation permissions.

7. A method for an infotainment system of a vehicle comprising:
    communicating with a primary mobile device over a first connection established between the infotainment system and an application integration component of a first vehicle-enabled application of the primary mobile device, the first vehicle-enabled application being assigned a first application identifier;
    communicating with a secondary mobile device over the first connection established between the infotainment system and the application integration component of the first vehicle-enabled application, the secondary mobile device being in communication with the primary mobile device over a second connection established between a device bridge component of the first vehicle-enabled application and a device bridge component of a second vehicle-enabled application of the secondary mobile device, the second vehicle-enabled application being assigned a second application identifier;
    validating permission to execute a remote procedure call as requested by the first vehicle-enabled application over the first connection, using first permissions assigned to the first application identifier of the first vehicle-enabled application according to a policy table of the vehicle; and
    validating permission to execute the remote procedure call as requested by the second vehicle-enabled application over the second connection as forwarded to the vehicle over the first connection via the first vehicle-enabled application as a passthrough, using second permissions assigned to the second application identifier of the second vehicle-enabled application according to the policy table of the vehicle, wherein the first permissions assigned to the first vehicle-enabled application by the policy table deny execution of the remote procedure call, the second permissions assigned to the second vehicle-enabled application by the policy table allow the execution of the remote procedure call, and the remote procedure call is allowed execution by the second vehicle-enabled application despite the remote procedure call from the second vehicle-enabled application being received over the first connection from the first vehicle-enabled application and the first vehicle-enabled application being denied permission.

8. The method of claim 7, wherein the remote procedure call requested by the first vehicle-enabled application is received over a first data flow provided over the first connection, the remote procedure call requested by the second vehicle-enabled application is received over a second data flow provided over the first connection, and the second data flow is encrypted by the secondary mobile device to prevent the primary mobile device from gaining access to contents of the second data flow.

9. The method of claim 7, further comprising:
communicating with another secondary mobile device over the first connection established between the infotainment system and the application integration component of the first vehicle-enabled application, the other secondary mobile device being in communication with the primary mobile device over a third connection established between the device bridge component of the first vehicle-enabled application and a device bridge component of a third vehicle-enabled application of the other secondary mobile device; and validating permission to execute the remote procedure call as requested by the third vehicle-enabled application over the first connection, using permissions assigned to the third vehicle-enabled application according to the policy table of the vehicle.

10. The method of claim 7, wherein the remote procedure call requires predefined permissions, the first vehicle-enabled application lacks the predefined permissions, and the second vehicle-enabled application has the predefined permissions.

11. The method of claim 10, wherein the predefined permissions include permission to utilize one or more of: driving characteristics, vehicle location data, vehicle navigation destinations, keyboard input, touch input, and vehicle information.

12. A non-transitory computer-readable medium comprising instructions that when executed by an infotainment system of a vehicle cause the infotainment system to perform operations including to:
communicate with a primary mobile device over a first connection established between the infotainment system and an application integration component of a first vehicle-enabled application of the primary mobile device, the first vehicle-enabled application being assigned a first application identifier;
communicate with a secondary mobile device over the first connection established between the infotainment system and the application integration component of the first vehicle-enabled application, the secondary mobile device being in communication with the primary mobile device over a second connection established between a device bridge component of the first vehicle-enabled application and a device bridge component of a second vehicle-enabled application of the secondary mobile device, the second vehicle-enabled application being assigned a second application identifier;

validate permission to execute a remote procedure call as requested by the first vehicle-enabled application over the first connection, using first permissions assigned to the first application identifier of the first vehicle-enabled application according to a policy table of the vehicle; and validate permission to execute the remote procedure call as requested by the second vehicle-enabled application over the second connection as forwarded to vehicle over the first connection via the first vehicle-enabled application as a passthrough, using second permissions assigned to the second application identifier of the second vehicle-enabled application according to the policy table of the vehicle, wherein the first permissions assigned to the first vehicle-enabled application by the policy table deny execution of the remote procedure call, the second permissions assigned to the second vehicle-enabled application by the policy table allow the execution of the remote procedure call, and the remote procedure call is allowed execution by the second vehicle-enabled application despite the remote procedure call from the second vehicle-enabled application being received over the first connection from the first vehicle-enabled application and the first vehicle-enabled application being denied permission.

13. The medium of claim 12, wherein the remote procedure call requested by the first vehicle-enabled application is received over a first data flow provided over the first connection, the remote procedure call requested by the second vehicle-enabled application is received over a second data flow provided over the first connection, and the second data flow is encrypted by the secondary mobile device to prevent the primary mobile device from gaining access to contents of the second data flow.

14. The medium of claim 12, further comprising instructions that when executed by the infotainment system of the vehicle cause the infotainment system to perform operations including to:
communicate with another secondary mobile device over the first connection established between the infotainment system and the application integration component of the first vehicle-enabled application, the other secondary mobile device being in communication with the primary mobile device over a third connection established between the device bridge component of the first vehicle-enabled application and a device bridge component of a third vehicle-enabled application of the other secondary mobile device; and validate permission to execute the remote procedure call as requested by the third vehicle-enabled application over the first connection, using permissions assigned to the third vehicle-enabled application according to the policy table of the vehicle.

15. The medium of claim 12, wherein the remote procedure call requires navigation permissions, the first vehicle-enabled application lacks navigation permissions, and the second vehicle-enabled application has navigation permissions.

* * * * *